Figure 1:
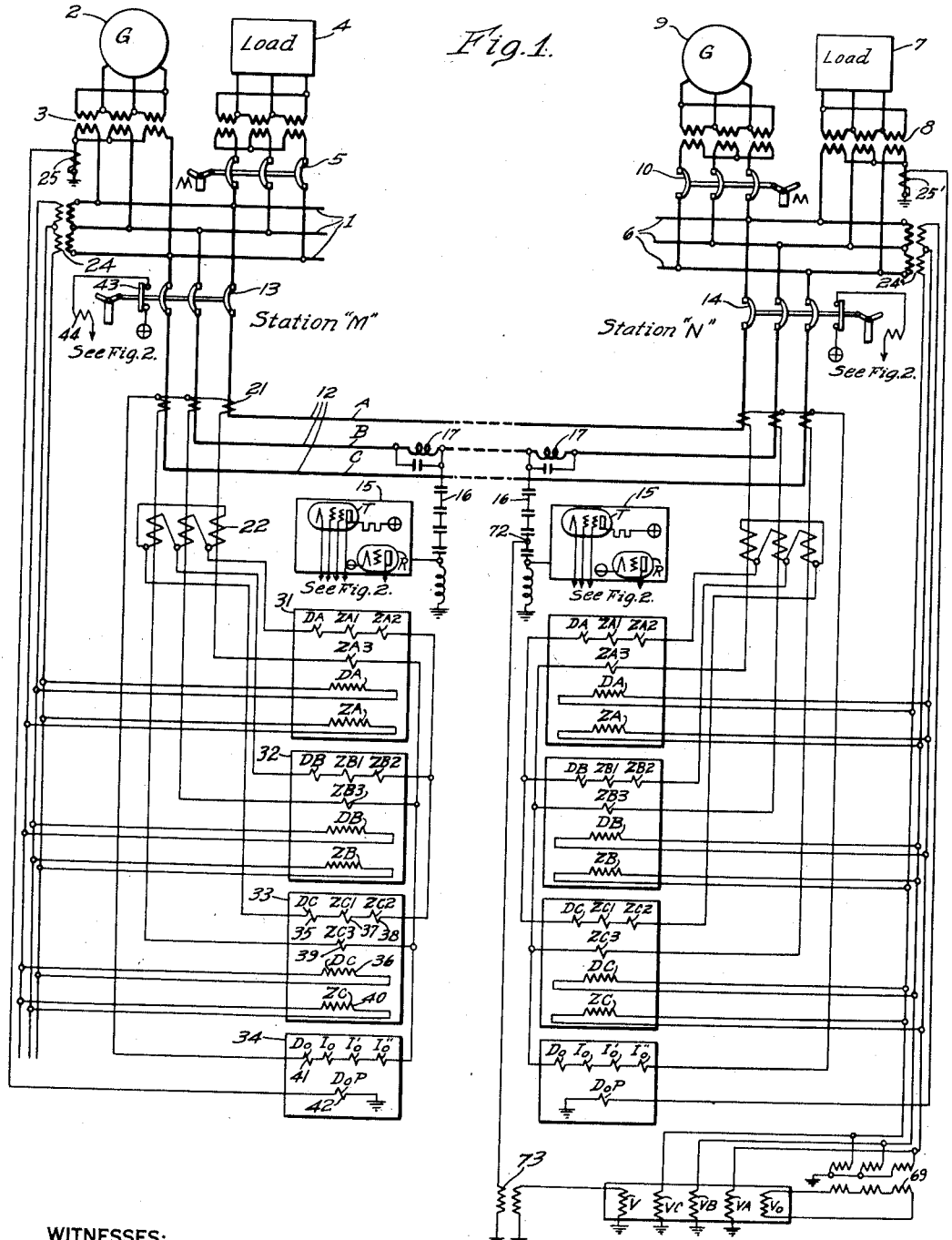

Patented Oct. 8, 1940

2,217,480

UNITED STATES PATENT OFFICE 2,217,480

PILOT-CHANNEL RELAYING AND COMMUNICATION SYSTEM

Edwin L. Harder, Forest Hills, Pa., assignor to Westinghouse Electric & Manufacturing Company, East Pittsburgh, Pa., a corporation of Pennsylvania Application March 31, 1939, Serial No. 265,256

6 Claims. (Cl. 177—352)

My invention relates to protective pilot relaying systems, for protecting power-lines against faults, and it has more particular relation to improvements relating to what I term "other uses" of the pilot channel for the purpose of making pilot relaying economically feasible in many instances.

My invention particularly relates to the carrier-current pilot protective relaying system which is almost universal, in this country, at the present day, in which the relaying system makes use of the pilot channel only momentarily, at rare intervals, when a fault occurs. These faults are rare, averaging about one fault per year for each 10 miles of line. When a fault occurs, a quick-acting fault-detector relay normally initiates the transmission of carrier-current over the pilot channel, thus so energizing the protective receiver-relays as to block tripping at both ends of the protected line-section. If the fault-power is flowing into the protected line section at any terminal thereof, the carrier-transmission is stopped by directional-relay action at that terminal, and if this carrier-stoppage occurs at all of the terminals of the protected section, the protective receiver-relays become deenergized in such manner as to permit tripping at each of the respective terminals. From the foregoing considerations, it will be observed that carrier is transmitted, for protective relaying purposes, for only a few seconds during each year.

For the foregoing reasons, efforts have been made, heretofore, to utilize the carrier-current equipment for other purposes, or by-product functions other than protective relaying, during the periods when there are no faults on the power system, such other uses including supervisory control, voice-communication, telemetering, and remote automatic tripping, all of which may be grouped under the classification of communication. It is obvious that, when such "other uses" are made of the carrier-current equipment, it is very necessary that the protective relaying system shall have absolute control of the transmission and stoppage of carrier, at every terminal, whenever there is a fault on the power system, and this requirement has heretofore led to difficulties which it is an object of my present invention to overcome.

The principal difficulty in controlling the "other uses" functions of carrier, at times of system-faults, has been in connection with a terminal or station in which there is not an assured source of power which is capable of supplying fault-currents to possible faults under all line-operating conditions. At any such terminal of a protected line-section, the absence of a source which is capable of supplying current of fault-magnitude to an internal fault on the protected section does not deleteriously affect the protective relaying functions, because there is not sufficient fault-current at such a terminal to operate the fault-detectors which would initiate the carrier transmission at such a terminal, in the first place; but where the transmission of carrier may have been initiated in response to "other-uses" control-devices, the absence of an adequate fault-current at such a terminal makes it impossible for the directional relaying elements to stop the carrier, even though the fault is within the confines of the protected line-section.

The foregoing difficulty could obviously be avoided by utilizing carrier-currents of different frequencies for protective relaying and "other-uses," respectively, but the use of two different carrier frequencies would introduce serious complications having a far-flung effect throughout the entire power system, introducing difficulties in the tuned carrier-current choke-coil arrangements, and other difficulties. It is simply not practicable, in most cases, to utilize carrier-currents of different frequencies, in order to enjoy the "other-uses" functions of the carrier-current relaying equipment.

On the other hand, in general, there is no such thing as a terminal which never has a source of power connected to it, other than through the protected line-section which terminates at said terminal. The problem consists in supplying power to a load-system in which there are possible operating conditions in which all of the local generators may be temporarily out of service, or to supply power to a so-called tapped load which is tapped off of an intermediate point on an interconnected transmission line.

In accordance with my invention, I utilize two blocking-means for making sure that carrier is not transmitted at a particular terminal in case of certain faults on the transmission line, neither one of these blocking-means being altogether reliable throughout all of the possible operating conditions, but at least one of them being operated during any possible operating condition. The first blocking-means consists of the ordinary directionally responsive relay-element, which is responsive to a so-called "internal" direction of flow of fault-current into the protected line-section at the terminal in question, this means being utilized to block carrier-current transmission at that terminal, regardless of whether the carrier-current transmission had been initiated in response to the operation of a fault-detector or in response to the operation of some "other-uses" control-function.

The second blocking-means is in the form of a voltage-responsive relay or relays which respond to power-line voltage-conditions which are indicative of the existence of a fault-condition, somewhere on the power-line, even in the absence of current-flow of fault-magnitude, said blocking-means being utilized, preferably, only to block carrier-transmission by the "other-uses" control-functions. It is well known that voltage-changes, such as a decrease in phase-voltages, or an increase in residual voltages, are not a reliable means for detecting the presence of a fault at a terminal having an adequate source of power connected thereto, and hence such voltage-response means have long since ceased to be regarded as adequate fault-detectors. This objection to the voltage-responsive devices does not apply, however, during the operating conditions when there is no adequate source of supply connected to the terminal, other than through the protected line-section, and since these are the only conditions in which the normal directionally responsive blocking-means are unreliable, it is obvious that the addition of these voltage-responsive means to the directionally responsive means provides an adequate source of blocking for the "other-uses" carrier-current transmission under all possible operating conditions.

Figure 2:
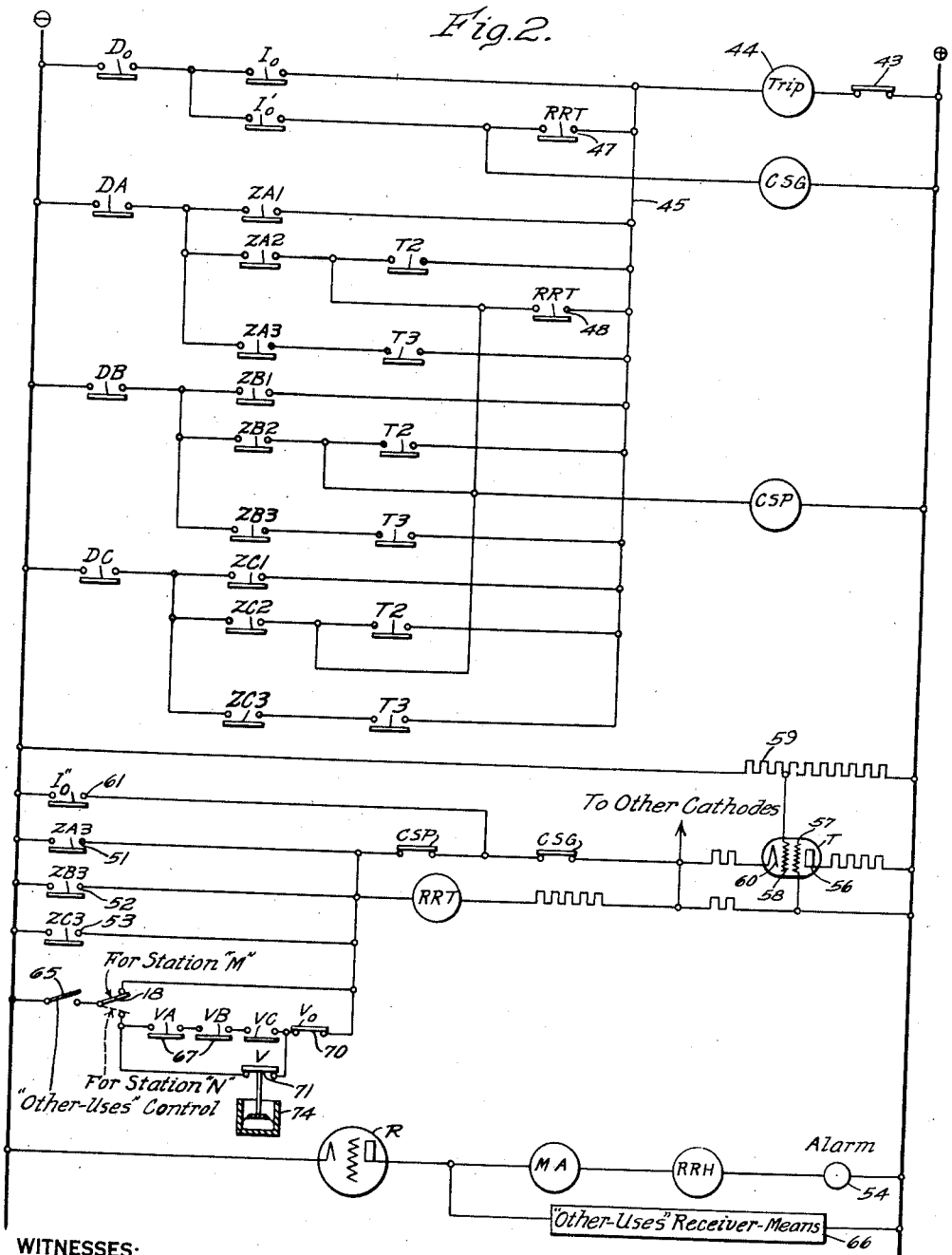

With the foregoing and other objects in view, my invention consists in the apparatus, combinations, circuits, methods and systems hereinafter described and claimed, and illustrated in the accompanying drawings, wherein Figure 1 is a diagrammatic view illustrating the alternating-current connections of circuits and apparatus embodying my invention in a preferred form of embodiment, and Fig. 2 is a similar view illustrating the direct-current connections thereof.

In the drawings, I have illustrated my invention in a simple three-phase system consisting of two stations or terminals which are designated Station "M" and Station "N," respectively. Station "M" is represented as a station which has an assured source of power, that is, a station at which there will never be any operating condition in which the station-bus 1 will be without a generator 2 connected thereto, as is indicated by the direct connection of the generator 2 to the bus 1, through delta-star power-transformer 3. In general, there will also be certain loads 4 connected to the station-bus 1, which may be done by means of circuit breakers 5. Station "N" is represented as a station which does not have an assured source of power. Thus it has a bus 6 which, at all times, supplies a load 7 through a star-delta power-transformer 8. During some or most of the time, but not assuredly at all times, the bus 6 may also have a generator 9 connected thereto through a circuit breaker 10. The two buses 1 and 6, at Stations "M" and "N", respectively, are joined by means of a transmission-line section 12, through circuit breakers 13 and 14, respectively.

The interconnecting line-section 12 is represented as being protected by a carrier-current relaying system, involving a combined transmitting and receiving carrier-current box or panel 15 at each station, in a manner which is well known in the art. Each panel 15 consists of a high-frequency oscillation-generator which is symbolized by a transmitter-tube T, and receiver equipment which is symbolized by a receiver-tube R, the carrier-current equipment being coupled to phase B of the line by means of a coupling capacitor 16, and the carrier-currents being more or less confined to said phase B by means of tuned resonant reactance devices 17 in a manner which is well known in the art.

The protective relaying equipment which is illustrated, in its simplest form, in connection with Station "M", is quite conventional, the alternating-current connections being indicated in Fig. 1, and the direct-current connections being indicated in Fig. 2, with the changeover switch 18 in its upper, or full-line, position, near the bottom of Fig. 2. In order to completely describe the illustrated embodiment of my invention, the essential points of this relaying equipment at Station "M" will now be described.

The line-frequency-responsive relaying equipment utilizes both a current-response which is obtained from a set of star-connected line-current transformers 21 and from a set of auxiliary delta-connected current-transformers 22, and a voltage response which is obtained from potential transformers 24 which are energized from the bus 1. The system also makes use of an auxiliary residual current transformer 25 which responds to the current in the grounded star point of the power-transformers 3, as indicated in Fig. 1.

Still referring to Fig. 1, it will be observed that there are four relaying groups or panels 31, 32, 33 and 34, the first three being identical, except that they are associated with different phases A, B and C of the protected line-section 12, and the fourth group being utilized to respond to residual or zero-phase-sequence currents. Each of the phase relay panels, such as the panel 31, is responsive to its own particular line-phase, such as phase A in this case, and consists of a directional element DA having a current coil 35 and a voltage coil 36, and three impedance elements ZA1, ZA2, and ZA3, each having its own individual current coil, as indicated at 37, 38 and 39, and having voltage coils which are all connected as indicated at 40. The numerals 1, 2 and 3, as applied to the impedance elements ZA, designate first, second and third zones, as is commonly understood in the art, the third-zone impedance element being the most sensitive one. The phase-fault-responsive relays 32 and 31, for the other two phases B and C, are distinguished by the letters B and C, respectively, instead of the letter A. The various connections for the voltage and current coils are well understood in the art, and are shown in the drawings, in view of which it is believed that no more detailed explanation is needed in order to explain the present invention.

Still referring to Fig. 1, the zero-sequence-relaying equipment 34 consists of a directional element $D_0$ having a main current winding 41 which is energized with the residual current from the line-current transformers 21, and an auxiliary or polarizing relay-coil $D_0P$, which is also designated by the numeral 42, and which is energized from the residual current-transformer 25. The residual relaying equipment 34 also includes three zero-phase-sequence overcurrent relays $I_0$, $I'_0$, $I''_0$, different degrees of sensitivity, the last one mentioned being the most sensitive.

Still referring to Station "M" as shown in Fig. 1, it will be noted that the line-sectionalizing circuit-breaker 13 is provided with an auxiliary breaker-contact 43 which is closed when the breaker is closed, and a trip-coil 44, the control-circuit of which is shown in Fig. 2.

Referring, now, to Fig. 2, it is noted that one terminal of the trip-coil 44 is connected to the positive bus (+) through the auxiliary breaker-switch 43, while the other terminal of the trip-coil is connected to an auxiliary tripping bus 45 which is energized from the negative bus (—) through various control-means. Referring to the lower part of Fig. 2, it will be noted that two receiver-relay coils are provided, designated RRT and RRH, respectively. The receiver-relay coil RRT is operative to tend to move the relay to its tripping position, so as to close two tripping contacts RRT, distinguished by the numerals 47 and 48, respectively, the tripping contacts 47 and 48 being connected so as to energize the tripping bus 45 under conditions to be subsequently described. The other receiver-relay coil RRH is a holding coil which is effective to prevent the tripping operation of the receiver-relay as long as said holding coil is energized.

The tripping coil RRT of the receiver-relay is energized, by means of one of the contacts 51, 52 or 53 of the sensitive impedance elements ZA3, ZB3 and ZC3, which are of sufficient sensitivity so that at least one of them responds whenever there is any fault on the transmission system anywhere in or near the protected line-section 12. The holding coil RRH of the receiver relay is connected in the plate circuit of the receiver tube R, in series with a milliammeter MA, and an alarm-relay 54.

Referring again, now, to the upper portion of Fig. 2, it will be noted that the auxiliary tripping bus 45 is energized independently of the carrier-current receiver-relay, in response to very severe faults accompanied by an internal direction of current, as indicated by the contacts $D_0$ and $I_0$, the contacts DA and ZA1, the contacts DB and ZB1, and the contacts DC and ZC1. In response to fault-indications which are not certain to be limited to faults within the confines of the protected line-section, as determined by the relays $I'_0$, ZA2, ZB2 and ZC2, the tripping circuit is completed, from the negative bus (—) to the tripping bus 45 through the receiver-relay tripping contacts 47 and 48, also distinguished by the letters RRT in Fig. 2. There are also back-up tripping features involving timing relays of different time-delay periods, as indicated by the contacts T2 and T3 in Fig. 2. As these connections are well known and form no vital part of my present invention, except that they are utilized in common with other relaying systems, I do not believe that any further description thereof is necessary.

Referring again to the bottom half of Fig. 2, the cathode-circuit of the transmitter tube-T is normally open-circuited so that the tube is not transmitting carrier-currents. The transmitter-tube T is represented as having a plate 56 which is normally connected to the positive bus (+), a screen grid 57 which is also normally connected to the positive bus (+), a control grid 58 which is negatively biased through a rheostat or potentiometer 59, and a cathode 60 which is adapted to be connected to the negative bus (—) by the closure of any one of the aforementioned contacts 51, 52 and 53 of the sensitive impedance elements ZA3, ZB3 and ZC3, or by the closure of the contact 61 of the sensitive zero-sequence overcurrent relay $I_0''$.

The blockage of carrier-current transmission is brought about, at Station "M", as shown in the bottom half of Fig. 2, by means of two contacts marked CSP and CSG, which are normally closed contacts of two auxiliary relays, having coils, which are also marked CSP and CSG, respectively, as shown in the upper half of Fig. 2. The coil CSG is energized whenever there is an internal ground-fault, as indicated by the closure of the contacts $D_0$ and $I'_0$, and the coil CSP is energized whenever there is an internal phase-fault as shown by the closure of the contacts DA and ZA2, or the corresponding contacts for either of the other two phases. It usually takes these auxiliary relays CSP and CSG longer to respond than the sensitive fault-detectors ZA3, ZB3 and ZC3 which close their contacts 51, 52 and 53, respectively, so that when the internal directional indication has been obtained, by the response of either the relay CSP or the relay CSG, its corresponding contact is opened deenergizing the cathode-circuit of the transmitter-tube T, thereby instantly interrupting the transmission of carrier.

As is commonly known, "ground-preference" is frequently given to the relaying system by by-passing the CSP contact with the ground-fault detector-contact 61 of the relay $I_0''$, as indicated in Fig. 2, so that it is impossible for the phase-fault directionally responsive relay CSP to interrupt the carrier-current transmission when there is a ground-fault on the system.

As shown in Fig. 2, the carrier-current equipment at Station "M" also includes, in parallel to the transmitter-starting relay-contacts 51, 52, 53, an additional transmission-controlling means, which is indicated symbolically by means of a simple switch 65, although ordinarily much more elaborate equipment would be utilized. This additional transmission-controlling means 65 is for the "other-uses" control, that is, for all functions other than response to line-faults, said "other-uses" functions being classified together under the designation "communication purposes." These "other-uses" may include pushbutton-control for testing the pilot circuit or carrier-current apparatus, supervisory control, distance-metering, distance-relaying, telephony, telegraphy, or the like. Complementary to this auxiliary "other-uses" control-means 65, there is also provided some sort of "other-uses" receiver-means 66, as symbolically represented by a rectangle in Fig. 2, the same being connected to be energized from the receiver-tube R.

The foregoing represents the relay, and communicating-system equipment as provided at Station "M", and as previously indicated, it is quite conventional, or at least previously available, since there is an assured source of supply at this station, as indicated at 2.

In Station "N", where there is not an assured source of supply, my present invention particularly applies. At this Station "N", there is equipment which closely parallels that which has been already described for Station "M", and in addition thereto, I have provided additional equipment in accordance with my invention. In the case of Station "N", the potential transformer 24' is connected to the bus 6, and the residual current-transformer 25' is connected in the grounded neutral circuit of the power transformer 8. Otherwise, the equipment which is common to the two stations is quite similar, and the description thereof will not be repeated.

The novel part of the equipment at Station "N" is shown at the right-hand bottom portion of Fig. 1, and near the bottom portion of Fig. 2.

This additional equipment is shown in the form of a voltage-responsive fault-detector means which is not dependent upon the existence of fault-current, and it is illustrated as consisting of undervoltage relaying means which is shown, by way of illustration, in the form of three relays VA, VB and VC which are energized, respectively, from the three phases of the line-voltage so that if there is a voltage-dip of predetermined severity in any one of the three line phases, the corresponding relay will open its contact 67 and interrupt the current leading from the "other-uses" control-means 65 to the cathode 60 of the oscillating or transmitting tube T, as shown in Fig. 2. The phase-voltage-responsive relays VA, VB and VC may be either single-phase or polyphase, and they may respond to either line-to-ground to line-to-line voltages. In the particular form shown, they are single-phase line-to-ground relays.

In systems in which there is not an adequate ground at the station (such as Station "N") where the relaying function is to be performed, it may be desirable also to supplement the phase-voltage relays VA, VB and VC with a residual-voltage relay V₀ which may be energized from the potential transformer 24' through an auxiliary open-delta potential-transformer bank 69, as shown in Fig. 1. When the residual-voltage relay V₀ is utilized, it will be made to open its contact 70 (Fig. 2) whenever a residual voltage of predetermined magnitude appears at the associated terminal "N" of the protected line-section 12.

The effect of the provision of the contacts 67 and 70 of the phase-voltage relays VA, VB and VC, and of the residual-voltage relay V₀, respectively, is to open-circuit the "other-uses" control 65 whenever there is a fault on the system, thus placing the carrier-current equipment under the absolute control of the protective relays which are normally provided for the purpose. As previously pointed out, this makes it possible to disconnect the "other-uses" control 65, even though there is not sufficient fault-current, flowing at the relaying point, to energize one of the internal-directional-responsive relays CSP or CSG.

An additional novel feature of my Station "N" as shown in Figs. 1 and 2, resides in the provision of an auxiliary voltage-relay V having a contact 71 which by-passes the three contacts 67 of the phase-voltage relays VA, VB and VC. The relay V is energized from the line-side of the sectionalizing circuit-breaker 14, as by means of a capacitor-potentiometer tap 72 on the capacitor coupling-device 16, at this station, in combination with an auxiliary potential transformer 73 which energizes the coil of the auxiliary-voltage relay V.

Whenever the line is energized, this auxiliary relay V is energized so as to open its contact 71, and when the line is deenergized, the relay-contact 71 begins to slowly close, under the control of a dashpot 74, or other time-delay mechanism, so that the auxiliary relay V will not operate for the duration, or for the amount, of the undervoltage which is obtained under abnormal system-conditions. The auxiliary relay V thus makes it possible to employ the "other-uses" functions of the carrier-current equipment while the power-line 12 is deenergized. It will be noted that the dash-pot 74 is so arranged that it retards the opening or drop-out operation of the relay, without materially retarding its movement in the closing direction, so that, when the line is reenergized, the relay V picks up without appreciable time-delay, and opens its contacts 71, so that the "other-uses" functions are again placed under the control of the phase-voltage relays VA, VB, and VC.

While I have described my invention in a form of embodiment which is at present preferred by me, it will be obvious that this particular embodiment is to be taken in an illustrative sense rather than in a limiting sense, as many changes of omission, addition and substitution may be made by those skilled in the art without departing from the essential spirit of my invention, I desire, therefore, that the appended claims shall be accorded the broadest construction consistent with their language and the prior art.

I claim as my invention:

1. The combination; with a protected power-line section having a predetermined terminal in which there is not an assured source of power capable of supplying fault-currents to possible faults under all line-operating conditions; of means for providing a pilot channel between said predetermined terminal and at least one other terminal of the protected section; a first transmission-controlling means at said predetermined terminal for controlling the transmission, at said predetermined terminal, of a predetermined kind of current into the pilot channel for a use or uses other than fault-response; a second transmission-controlling means at said predetermined terminal for ensuring the transmission, at said predetermined terminal, of said predetermined kind of current into the pilot channel, regardless of the condition of said first transmission-controlling means, in response to fault-current power-line conditions which are indicative, at said predetermined terminal, of the existence of a fault-condition somewhere on the power line; a third transmission-controlling means at said predetermined terminal for blocking the transmitting operation of said first and said second transmission-controlling means at said predetermined terminal in response to a direction of power-line fault-current which is indicative, at said predetermined terminal of a fault on the protected-section side of said predetermined terminal; a fourth transmission-controlling means at said predetermined terminal for blocking the transmitting operation of said first transmission-controlling means at said predetermined terminal in response to power-line voltage-conditions which are indicative, at said predetermined terminal, even in the absence of power-line current-flow, of the existence of a fault-condition somewhere on the power line; a first receiver-means at at least the aforesaid one other terminal of the protected section for responding to the pilot-channel current as controlled by said first transmission-controlling means; line-sectionalizing relaying means at at least said one other terminal for effecting a circuit-interrupting operation on the protected section at said other terminal in response to predetermined power-line conditions at said other terminal; and a second receiver-means at at least said one other terminal for blocking the circuit-interrupting operation of said line-sectionalizing relaying means at said other terminal in response to the receipt of the aforesaid predetermined kind of current from the pilot channel.

2. The invention as defined by claim 1, in combination with time-delayed undervoltage means, responsive, after a predetermined time, to a failure of voltage on the power line at said predetermined terminal, for removing the blocking action of said fourth transmitting-controlling means at said predetermined terminal.

3. The invention as defined in claim 1, characterized by said fourth transmission-controlling means comprising relaying means for responding to a predetermined drop in the voltage appearing on the wires of the power line.

4. The invention as defined in claim 1, characterized by said power line being a three-phase line, and said fourth transmission-controlling means comprising relaying means for responding to a predetermined increase in the residual voltages on the power line at said predetermined terminal.

5. The invention as defined in claim 1, characterized by said power line being a three-phase line, and said fourth transmission-controlling means comprising relaying means for responding to a predetermined increase in the residual voltages on the power line at said predetermined terminal and relaying means for responding to a predetermined decrease in the voltages appearing on the several phase-conductors of the power line at said predetermined terminal.

6. The invention as defined in claim 1, characterized by said pilot channel and the respective transmitting and receiving means including means for utilizing the power line itself as a guiding or transmitting channel for superimposed high-frequency carrier currents, a common high-frequency generating-means serving both said first and said second transmission-controlling means, and a common high-frequency receiving and amplifying means serving both said first and said second receiver means.

EDWIN L. HARDER.